US012686467B2

(12) United States Patent
Chan

(10) Patent No.: US 12,686,467 B2
(45) Date of Patent: Jul. 21, 2026

(54) POWER-ASSISTED DRIVE ASSEMBLY

(71) Applicant: Yuk Chun Jon Chan, Hong Kong (CN)

(72) Inventor: Yuk Chun Jon Chan, Hong Kong (CN)

( * ) Notice: Subject to any disclaimer, the term of this patent is extended or adjusted under 35 U.S.C. 154(b) by 424 days.

(21) Appl. No.: 18/259,003

(22) PCT Filed: Jun. 7, 2022

(86) PCT No.: PCT/CN2022/097403
§ 371 (c)(1),
(2) Date: Jun. 22, 2023

(87) PCT Pub. No.: WO2023/236046
PCT Pub. Date: Dec. 14, 2023

(65) Prior Publication Data
US 2024/0383565 A1 Nov. 21, 2024

(51) Int. Cl.
*B62M 6/60* (2010.01)
*B62M 11/04* (2006.01)

(52) U.S. Cl.
CPC .............. *B62M 6/60* (2013.01); *B62M 11/04* (2013.01)

(58) Field of Classification Search
CPC .................................. B62M 6/60; B62M 11/04
See application file for complete search history.

(56) References Cited

U.S. PATENT DOCUMENTS

| | | | |
|---|---|---|---|
| 5,941,333 A | 8/1999 | Sun et al. | |
| 10,967,934 B2 * | 4/2021 | Ferguson | A61G 5/041 |
| 11,866,187 B1 * | 1/2024 | Lin | H02K 11/25 |
| 2024/0286707 A1 * | 8/2024 | Mueller | B62M 11/04 |

FOREIGN PATENT DOCUMENTS

| | | |
|---|---|---|
| CN | 1140681 A | 1/1997 |
| CN | 1151959 A | 6/1997 |
| CN | 2401447 Y | 10/2000 |
| CN | 112224329 A | 1/2021 |

(Continued)

OTHER PUBLICATIONS

The International Search Report mailed Dec. 27, 2022; PCT/CN2022/097403.

(Continued)

*Primary Examiner* — Gonzalo Laguarda

(57) ABSTRACT

A power-assisted drive assembly comprising a sprocket assembly, a drive spindle drivably connected to the sprocket assembly through a first one-way sprag clutch, a main housing rotatably supporting the drive spindle and defining a spindle axis, the main housing comprising a spindle supporting portion and a motor mounting portion, a motor mounted on the motor mounting portion and drivably connected to the sprocket assembly, the motor having a drive axis offset to the spindle axis, a gear mechanism drivably connecting the motor and the sprocket assembly. The gear mechanism comprises a second one-way sprag clutch and a drive gear mounted concentrically with the sprocket assembly. The motor comprises a stator surrounded by a rotor, a pinion gear is provided on the rotor drivably connects with the gear mechanism for driving the drive gear and the sprocket assembly.

20 Claims, 9 Drawing Sheets

(56)            References Cited

FOREIGN PATENT DOCUMENTS

| | | | | | |
|---|---|---|---|---|---|
| CN | 112224330 | A | 1/2021 | | |
| CN | 213705695 | U | 7/2021 | | |
| CN | 213705696 | U | 7/2021 | | |
| CN | 213705697 | U | 7/2021 | | |
| EP | 0743238 | A1 | 11/1996 | | |
| EP | 0765804 | A2 * | 4/1997 | .............. | B62M 6/50 |

OTHER PUBLICATIONS

The Written Opinion of the International Searching Authority mailed Dec. 26, 2022; PCT/CN2022/097403.

* cited by examiner

POWER-ASSISTED DRIVE ASSEMBLY

FIELD OF THE INVENTION

The present invention relates to a power-assisted drive assembly for use particularly, but not exclusively, in a manually driven apparatus. The invention also relates particularly, but not exclusively, to a power-assisted drive assembly installable to a pedal cycle such as a bicycle.

BACKGROUND OF THE INVENTION

It is known to provide some manually propellable pedal cycles such as bicycles with an electric powered drive unit to assist a rider in propelling the same, especially ascending a slope, although the drive unit may often be used to power the bicycle over any other terrain.

It is also known to utilize an in-wheel motor, or a hub motor, in a power-assisted bicycle such that a gear mechanism can be omitted and the resulting drive unit is simple to manufacture. For such a known power-assisted bicycle using an in-wheel motor, it can be manufactured by simply replacing a hub of one wheel with an in-wheel motor, while the pedals drive the rear wheel through a sprocket and a chain in a generally conventional mechanical arrangement. In such an arrangement, no motor drive force need be transferred through the bicycle chain. Therefore, a pedal driving force and a motor driving force can be delivered separately from each other.

A major drawback of the known in-wheel or hub motor arrangement is that it can only provide limited torque output. A hub motor power-assisted drive unit cannot utilize gear shifting or offer any changeability of gear ratio for the output generated by the power-assisted drive unit. Another shortcoming of the hub motor arrangement is that it can offer only very limited torque output, in which such arrangement is only capable for propelling bicycles on smooth roads. A hub motor arrangement further lacks the integration of torque sensing arrangement making it not suitable for using as a power-assisted drive unit.

It also creates production and assembly complications as well as replacement parts problems. In the event that an in-wheel motor fails or requires maintenance, for instance, it often requires the wheel to be removed thus disabling the bicycle. Further, in case of a motor failure or maintenance, the wheel accommodating the in-wheel motor may no longer be rotatable such that it is not even possible to propel the bicycle by manually pedaling. Most of all, the hub motor arrangement is not genuinely designed to be retrofittable to the frame of existing bicycles with multi speed gearing in place. If a conventional multi speed bicycle is to be retrofitted with the hub motor, numerous parts, i.e., the rear wheels, rear sprocket and derailleur would have to be removed from the bicycle rendering the bicycle without gear changing ability.

The foregoing is just some of the common technical issues encountered with conventional power-assisted drive units.

SUMMARY OF THE INVENTION

According to an aspect of the present invention, there is provided a power-assisted drive assembly for fitting on a bottom bracket shell of a bicycle comprising:

a sprocket assembly;
a drive spindle drivably connected to the sprocket assembly through a first one-way sprag clutch;

a main housing rotatably supporting the drive spindle and defining a spindle axis, the main housing comprising a spindle supporting portion and a motor mounting portion;
a motor mounted on the motor mounting portion and drivably connected to the sprocket assembly, the motor having a drive axis offset to the spindle axis;
a gear mechanism drivably connecting the motor and the sprocket assembly, comprising a second one-way sprag clutch and a drive gear mounted concentrically with the sprocket assembly, the drive gear adapted for removably coupling with the sprocket assembly; and
a mounting arrangement for mounting to the pedal cycle;
wherein the motor comprises a stator surrounded by a rotor, a pinion gear is provided on the rotor drivably connects with the gear mechanism for driving the drive gear and the sprocket assembly, the gear mechanism further includes a reduction gear set arranged between the rotor of the motor and the drive gear.

In an embodiment, the sprocket assembly comprises a detachable chainring adapted for engaging a chain.

In an embodiment, the reduction gear set comprises a double stage reduction gear providing a reduction ratio of at least 1:20.

In an embodiment, the second one-way sprag clutch is provided within the gear mechanism between the motor and the drive gear, the second one-way sprag clutch allows the sprocket assembly to freewheel with respect to the rotor of the motor with the sprocket assembly rotating in only one direction.

In an embodiment, the second sprag clutch is fitted within a counter gear assembly in the gear mechanism.

In an embodiment, the second one-way sprag clutch is fitted within a counter gear assembly connecting a pinion gear of the motor to the drive gear.

In an embodiment, the second one-way sprag clutch is sleeved between a first counter gear and a counter gear shaft within the counter gear assembly.

In an embodiment, the power-assisted drive assembly further comprising a torque sensing assembly provided between the drive spindle and the drive gear.

In an embodiment, the first one-way sprag clutch is disposed between the torque sensing assembly and the drive gear, the first one-way sprag clutch allows the drive spindle to freewheel with respect to the sprocket assembly in only one direction.

In an embodiment, the drive spindle is adapted for engagement with the torque sensing assembly via a spline connection.

In an embodiment, the rotor of the motor is cylindrical shaped, the rotor comprises an inner circumferential wall, with a plurality of permanent magnets circumferentially arranged on the inner circumferential wall.

In an embodiment, the rotor of the motor has a diameter within a range of 40 mm to 55 mm.

In an embodiment, the stator of the motor is a stator stack comprises metallic windings.

In an embodiment, the motor is a permanent magnet synchronous motor.

In an embodiment, the motor is a brushless DC outrunner motor.

In an embodiment, the mounting arrangement comprises a first mounting part connected to the spindle support portion and is insertable into the bottom bracket shell from a driving side, and a second mounting part insertable into the bottom bracket from a non-driving side, an engagement between the first and the second mounting parts is adapted for exerting a pressure on the two sides of the bottom bracket shell for securing the drive assembly with respect to the bottom bracket shell.

In an embodiment, the engagement between the first mounting part and the second mounting part is a thread engagement.

In an embodiment, the sprocket assembly is detachably coupled to the drive gear by a spline connection.

In an embodiment, the sprocket assembly comprises a locking member adapted for maintaining the spline connection between the sprocket assembly and the drive gear.

In an embodiment, the locking member is a lock plate adapted for detachably coupling to the drive gear to act against the sprocket assembly along a spindle axis defined by the spindle.

BRIEF DESCRIPTION OF THE DRAWINGS

The present invention will now be more specifically described by way of example only with reference to the accompanying drawings, in which.

The figures herein are for illustrative purposes only and are not necessarily drawn to scale.

DESCRIPTION OF THE PREFERRED EMBODIMENTS

The following clearly and completely describes the technical solutions in the embodiments of the present invention with reference to the accompanying drawings. Apparently, the described embodiments are merely some but not all of the embodiments of the present invention. All other embodiments based on the embodiments of the present invention and obtained by a person of ordinary skill in the art without investing creative efforts shall fall within the scope of the present invention.

In the following, a number of terms are used throughout the description and the claims of which their definitions should be taken according to their broadest meaning according to a person skilled in the art. In particular, "pedal cycle" generally refers to a manually driven vehicle powered by pedaling cycle motor by a rider, i.e., a bicycle. "Bottom bracket shell" essentially refers to the part of the bicycle frame where the spindle goes through and supporting the bottom bracket or bottom bracket bearings. "Driving side" essentially refers to the side of the bicycle which the drivetrain (i.e., chainring, sprockets, etc.) is mounted, while "non-driving" side is the side opposite to the driving side. "Chainline" generally refers to the distance between the centreline of the bicycle frame and the average centreline of the chainring, it can also refer to how straight the chain runs between the front and rear sprockets of the bicycle. In particular, a correct chainline is crucial for drivetrain reliability and usability. "Spline connection" typically refers to the connection between two relatively rotatable components, for example, a shaft with external spline and a hub with internal spline, for transmission of torque or rotation. "Thread engagement" refers to the engagement between two complementarily threaded parts, such as a bolt and a nut, while "thread engagement length" refers to the axial distance through which the fully formed threads of both the nut and bolt are in contact. A "sprag clutch" is a one-way freewheel clutch resembling a roller bearing but, instead of cylindrical rollers, non-revolving asymmetric sprags, or other elements allowing single direction rotation, are used.

Figure 1:
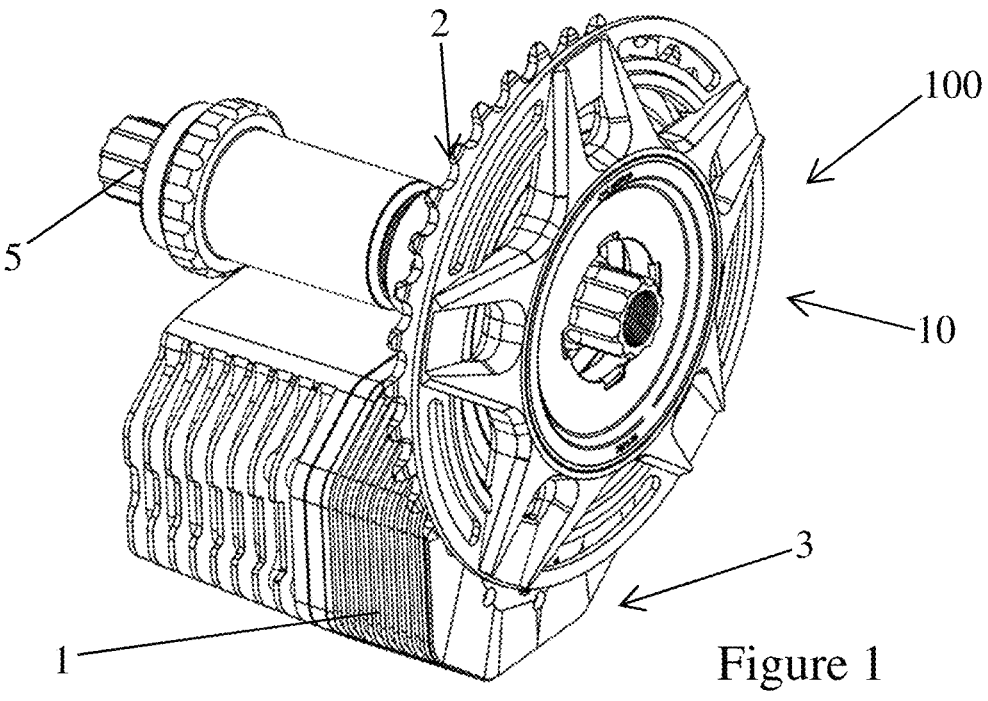
FIG. 1 shows a perspective view of a power-assisted drive assembly according to the present invention.
Figure 2:
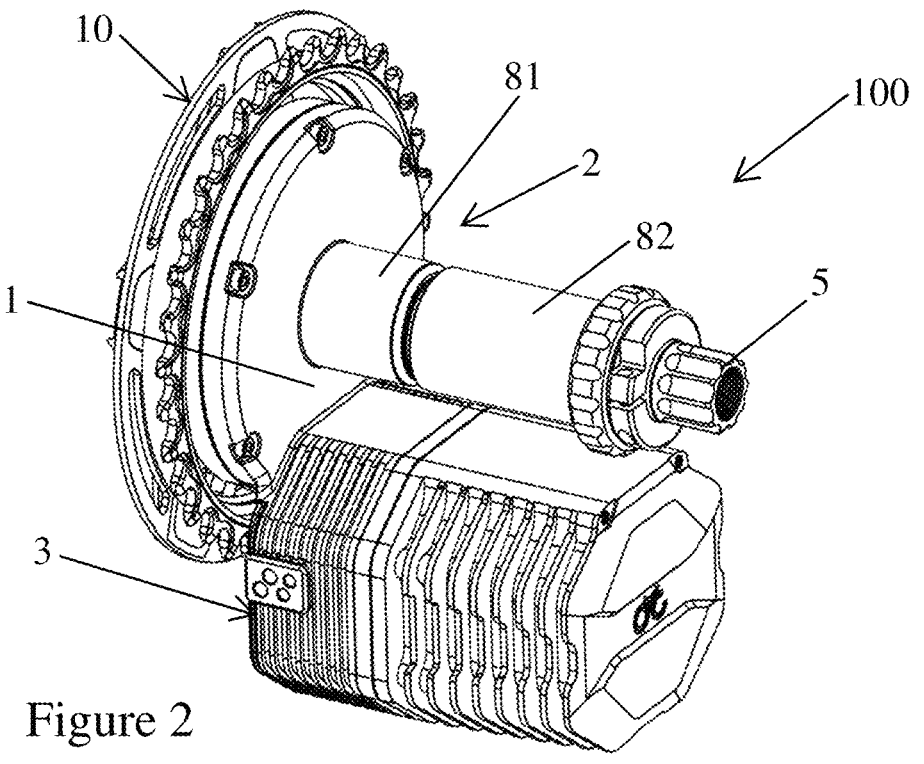
FIG. 2 shows another perspective view of the power-assisted drive assembly according to the present invention.

FIG. 1 and FIG. 2 illustrate an embodiment of the power-assisted drive assembly 100 according to the present invention. In a pedal cycle equipped with the power-assisted drive assembly 100, at least two drive modes may be provided, namely, a pedaling mode in which the rider manually pedals the pedal cycle, and a power-assisted mode of which the motor delivers an assistive power to the chainring with the rider simultaneously pedaling the pedal cycle.

Figures 3, 4:
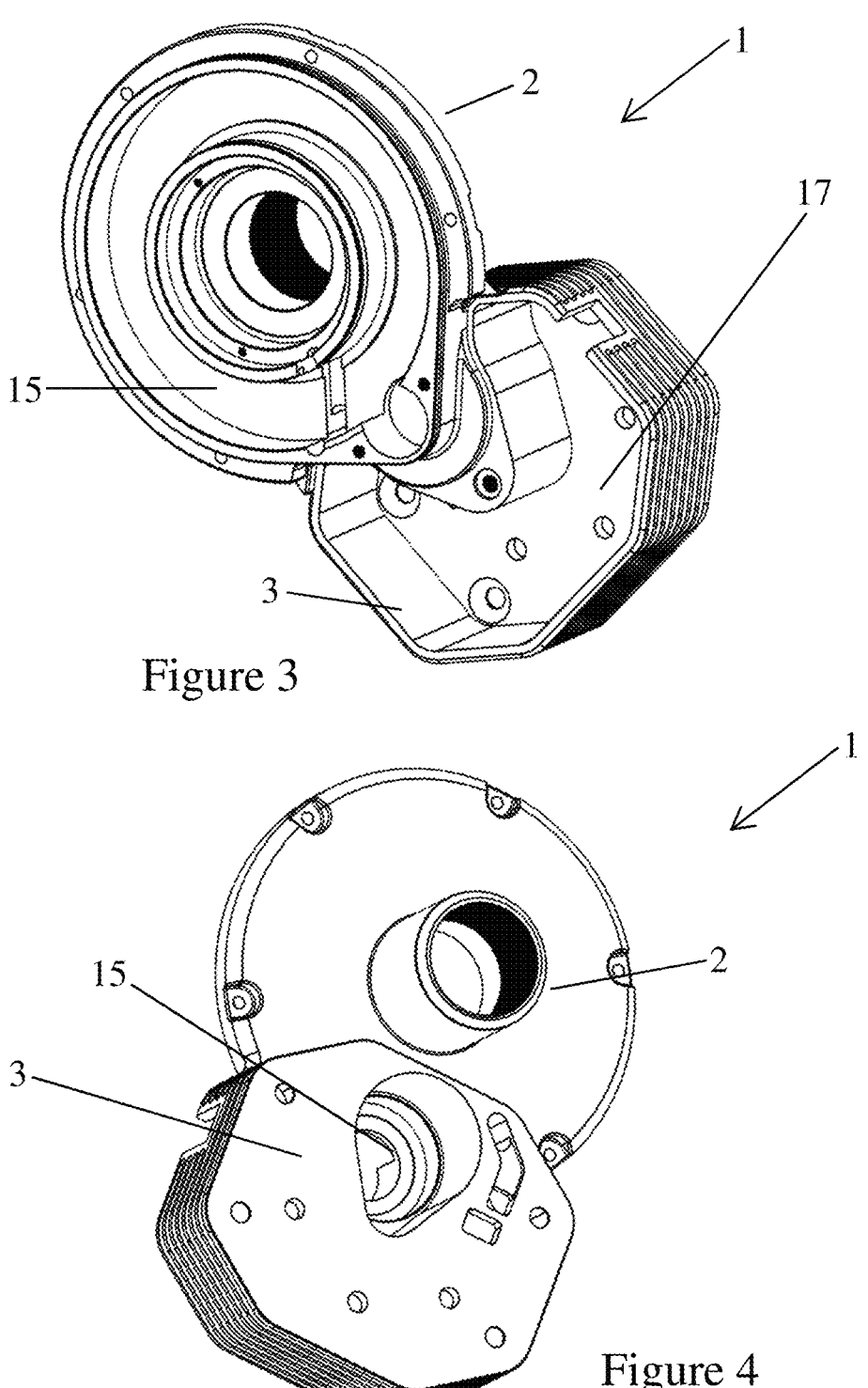
FIG. 3 is a view showing a main housing of the power-assisted drive assembly.
FIG. 4 is another view showing the main housing of the power-assisted drive assembly.

Referring to FIG. 3 and FIG. 4, the power-assisted drive assembly includes a main housing 1 for enclosing various internal components of the power-assisted drive assembly 100. Specifically, as shown, the main housing 1 can be divided into two portions, namely, a spindle supporting portion 2 and a motor mounting portion 3. Preferably, the two portions are integrally formed with the main housing. The spindle supporting portion 2 is provided with a through bore 4 for a drive spindle 5 to pass through. The spindle supporting portion 2 rotatably supports the drive spindle 5 through at least one ball bearing provided therebetween (not shown). Naturally, the rotation of the spindle 5 defines a spindle axis, or a pedalling axis, which the crank arms and pedals (not shown) revolve about. The drive spindle 5 includes two ends each adapted for removably coupling with a crank arm through a spline connection, as shown in FIG. 1 and FIG. 2.

Figure 5:
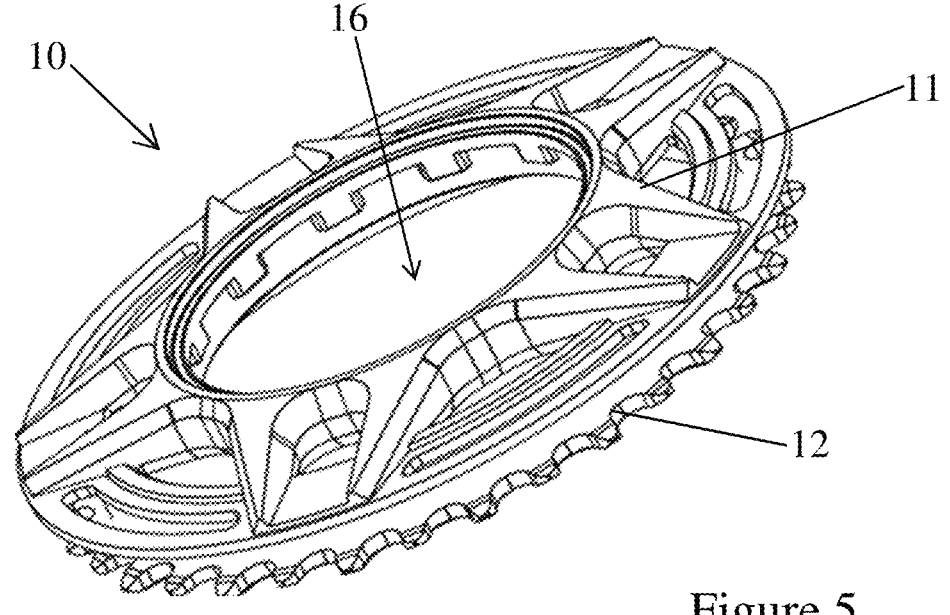
FIG. 5 is a view showing a sprocket assembly detached from the power-assisted drive assembly as shown in FIG. 1 and FIG. 2.
Figure 6A:
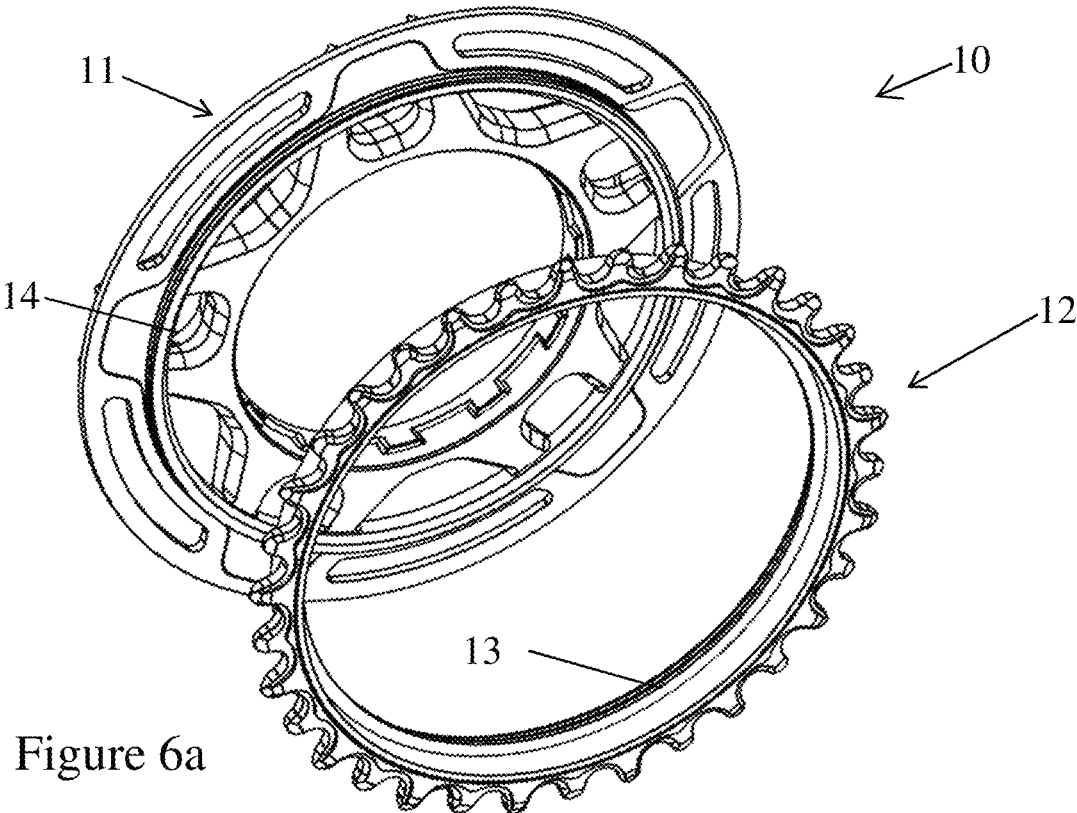
FIG. 6a is an exploded view of the sprocket assembly according to an embodiment of the present invention.
Figures 6B, 7:
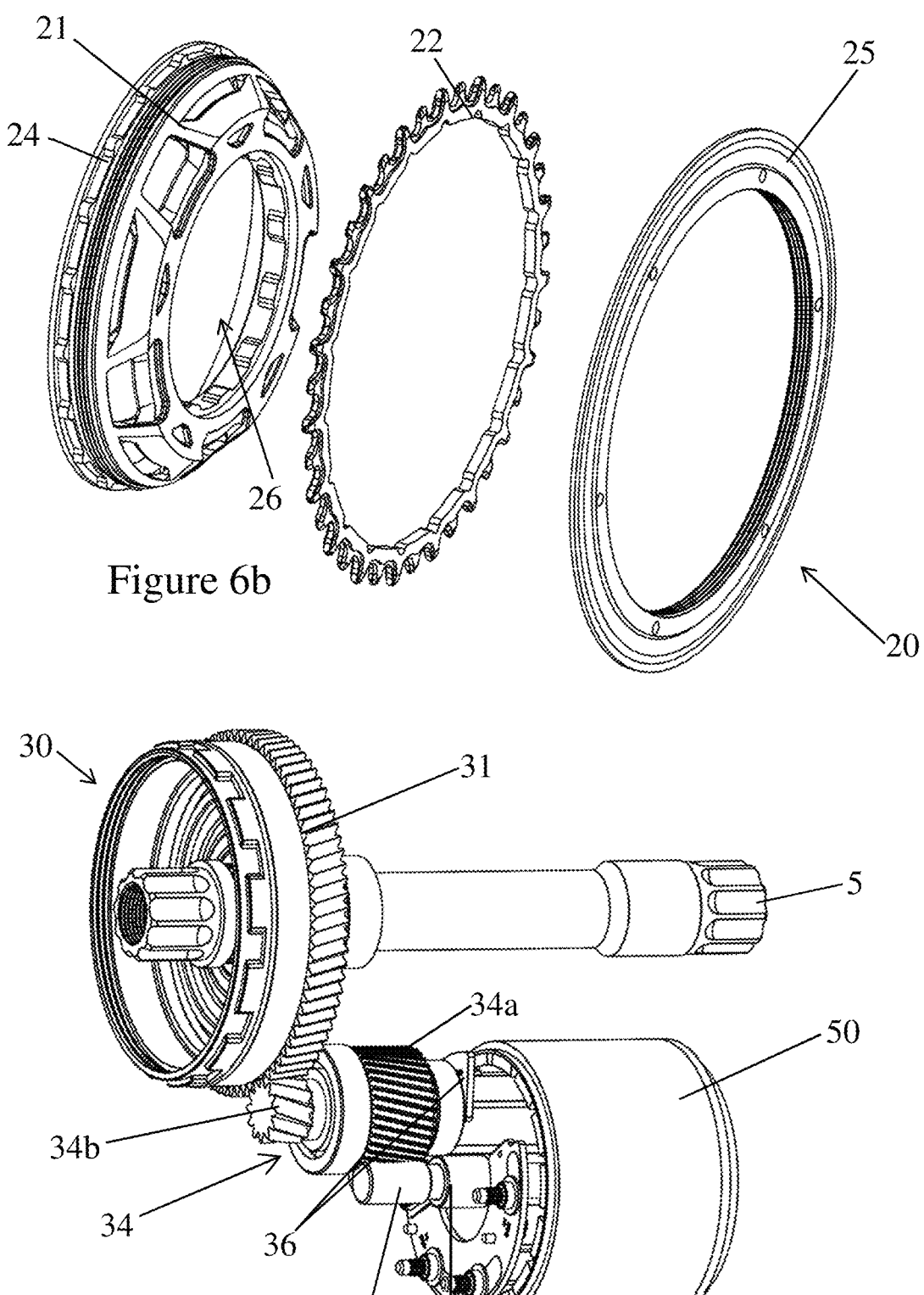
FIG. 6b is an exploded view of a sprocket assembly according to another embodiment of the present invention.
FIG. 7 is a view showing a gear mechanism of the power-assisted drive assembly.

The power-assisted drive assembly includes a sprocket assembly 10 for a drivable engagement with a chain (not shown) connecting to, for instance, a rear wheel sprocket of a pedal cycle for supplying driving force. Referring to FIG. 5, the sprocket assembly 10 includes a chainring 12 attached to a sprocket body 11. Preferably, as shown in FIG. 6a and FIG. 6b, the chainring 12 can be detached from the sprocket body 11 for facilitating the replacement of chainring. For instance, as shown in FIG. 6a, the sprocket body 11 and the chainring 12 are coupled through a thread engagement. Specifically, as shown, the chainring 12 may be provided with an annular extension 13 protruding a certain width in its axial direction. Threads are provided on the inner side of the annular extension 13. Complementarily, a corresponding annular extension 14 may be formed on the sprocket body 11 with threads on its outer side. The thread engagement between the two annular extensions 13, 14 allows the chainring 12 to be releasably coupled with the sprocket body 11. To provide a desired coupling strength, the thread engagement between the two annual extensions 13, 14 would preferably have at least 5 mm of engagement length. Moreover, the width of the annular extensions of the chainring 12 and the sprocket body 11 determines the axial position of the chainring 12, hence the chainline. Through providing an annular extension of a different width, either on the chainring 12 or the sprocket body 11, or both, the axial position of the chainring 12, or the chainline, may be adjusted. Such mounting method allows a small chainring to be used while maintaining a desirable chainline or chain alignment.

FIG. 6*b* shows an alternative embodiment of the sprocket assembly 20. The sprocket assembly 20 includes three parts, namely, a sprocket body, a chainring 22 and a retaining member 25. Specifically, the sprocket body 21 is provided with an outer flange portion 24 for supporting the chainring 22. In order to restrict relatively rotation between the sprocket body 21 and the chainring 22, a spline engagement arrangement is provided between the two parts, as shown. Moreover, the retaining member 25 is a threaded collar for coupling with the sprocket body 21 through a thread engagement. In particular, the retaining member 25, upon engagement and tightened to the sprocket body 21, acts against the chainring 22 in the axial direction towards the outer flange portion 24, thereby securing the chainring 22 on the sprocket body 21. Through providing a chainring 22 of a different size or different number of teeth, the drive ratio for the pedal cycle may therefore be altered. The sprocket assembly 10, 20 may be rotatably supported by the spindle supporting portion 2 of the main housing 1 through one or more ball bearings.

Referring to FIG. 7, the power-assisted drive assembly 100 includes a gear mechanism 30 housed within the main housing 1. The gear mechanism 30 occupies an internal space of the main housing 1 spanning across the spindle supporting portion 2 and the motor mounting portion 3. The internal space may also be referred as the gear cavity 15, as shown in FIG. 3 and FIG. 4. Situated within the gear cavity 11, the gear mechanism 30 is provided for transferring drive power from a motor 50 to the chainring 12, 22 of the sprocket assembly 10, 20 for driving a wheel of the pedal cycle through a chain (not shown). The gear mechanism 30 includes reductions gears for mechanically connecting the motor 50 and the sprocket assembly 10, 20. The reduction gears are situated between the motor 50 and a drive gear 31, as can be seen in FIG. 7. In the present embodiment, a double reduction gear arrangement is adopted in the gear mechanism 30, which includes a pinion gear 32 attached to the output shaft 33 of the motor 50, a counter gear assembly 34, and a drive gear 31.

Figures 10, 11, 12:
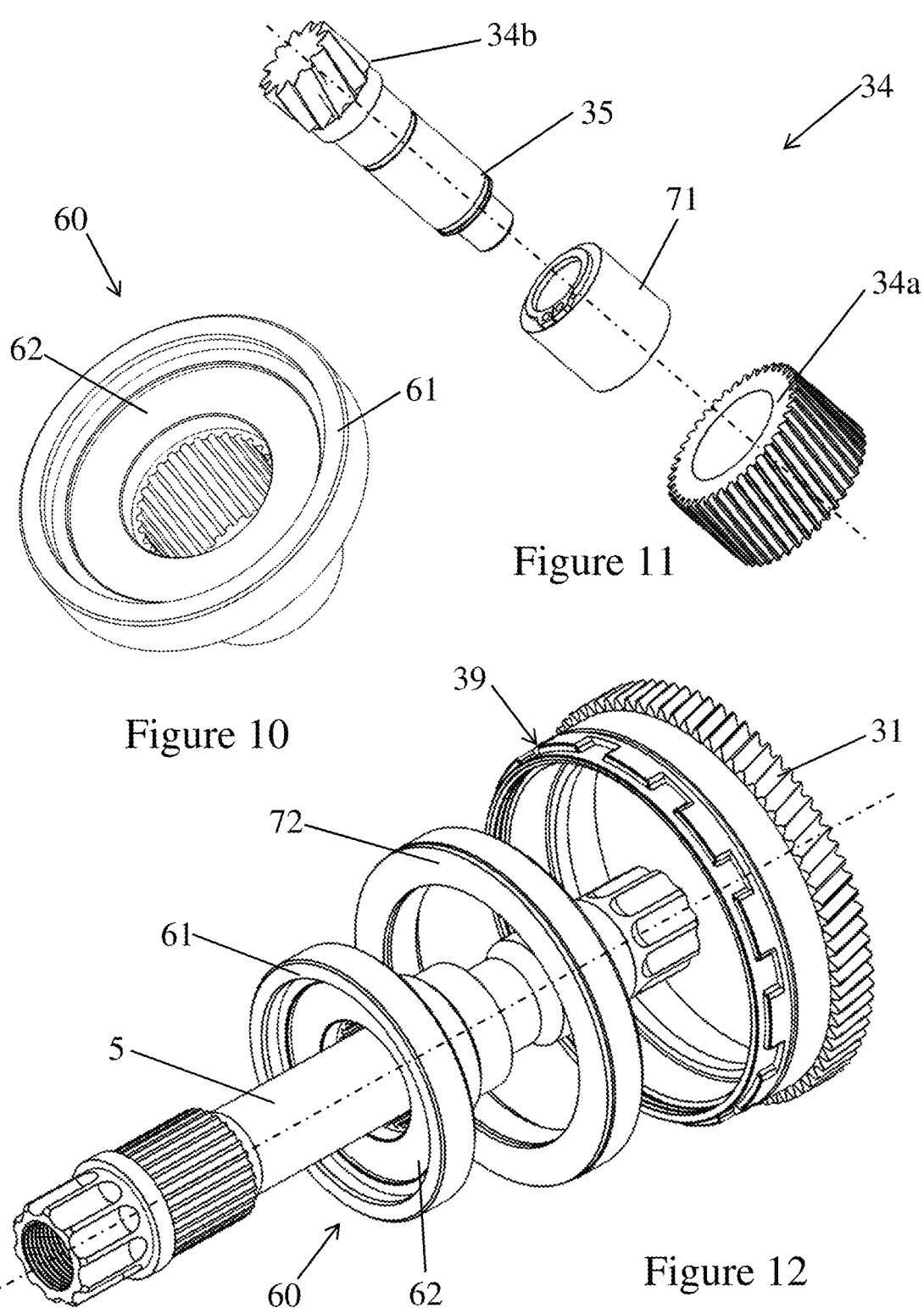
FIG. 10 is a view showing the torque sensing assembly.
FIG. 11 is an exploded view showing a first sprag clutch within a counter gear.
FIG. 12 is an exploded view showing a second sprag clutch within the drive gear.

As shown in FIG. 11, the counter gear assembly 34 includes a first counter gear 34*a* rotatably supported on a counter shaft 35 via a first sprag clutch 71 and meshes with the pinion gear 32, whilst a second counter gear 34*b* is fixed provided on the counter shaft 35. Through the sprag clutch, the first counter gear 34*a* can be rotated relative to the second counter gear 34*b* only in a single direction. The second counter gear 34*b* meshes with drive gear 31 to provide an amplificated torque. The drive gear 31 is rotatably supported by the spindle supporting portion 2 of the main housing 1, for instance, by a ball bearing, and lies concentric with the drive spindle 5. For instance, the gear mechanism 30 may be able to provide a reduction gear ratio of up to about 1:15, but a different reduction gear ratio may be adopted according to different speed or torque requirements. Advantageously, helical gears with inclined teeth are used in the gear mechanism 30 for maximizing durability and efficiency.

In an embodiment, the motor 50 is an outrunner motor which includes a stator surrounded by a rotor, with the pinion gear 32 is provided on the rotor which drivably connects with the gear mechanism 30. Specifically, the rotor of the motor is cylindrical shaped having an inner circumferential wall, with a plurality of permanent magnets circumferentially arranged thereon. The stator of the motor is a stator stack housing metallic winding. Generally, permanent magnet synchronous motor is used for powering the drive assembly, and more preferably, a brushless DC outrunner motor is used for high torque application, for example, providing assistive power for a mountain bike.

Figure 8:
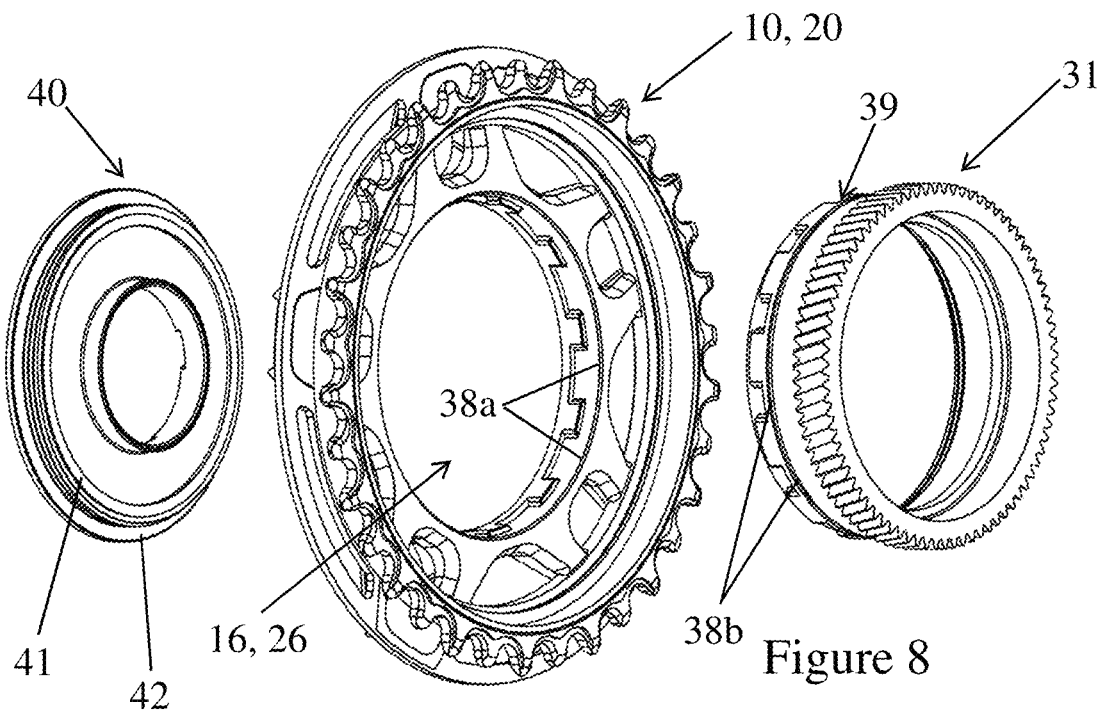
FIG. 8 is an exploded view showing the coupling of the sprocket assembly with a drive gear.
Figure 9:
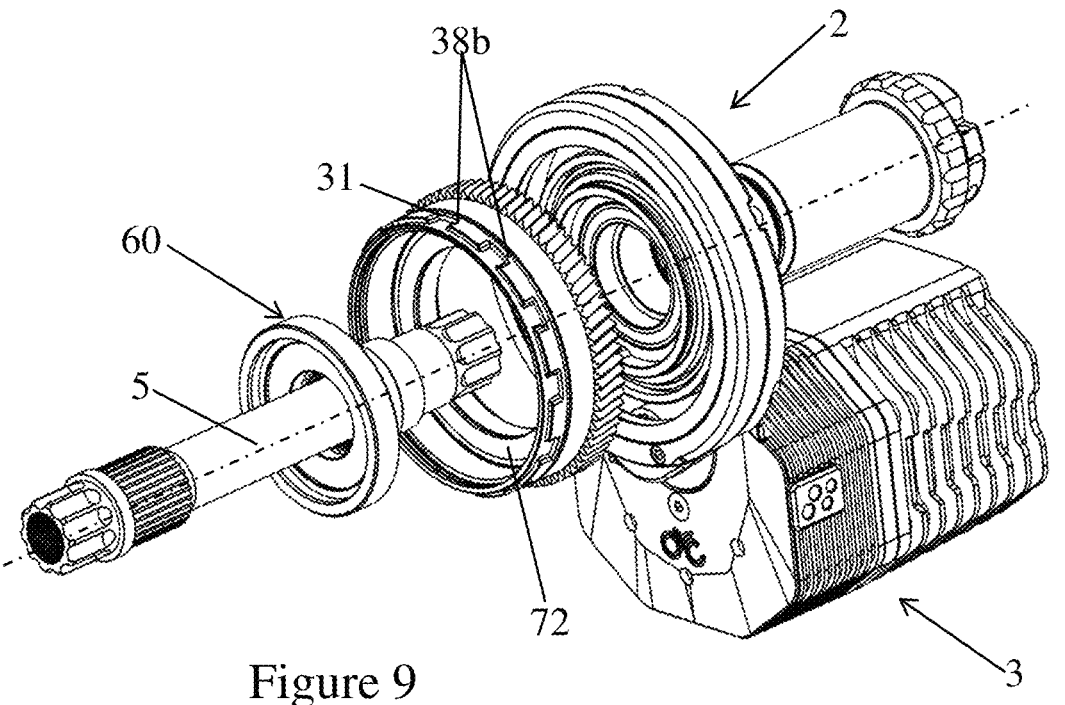
FIG. 9 is a view showing the coupling of a drive spindle, a torque sensing assembly and a sprag clutch mounted within a drive gear, to a main housing.

As illustrated in the FIG. 8 and FIG. 9, the drive gear 31 is essentially a ring gear and is rotatably supported in the spindle supporting portion 2 by a ball bearing. To maximize the usage of space, the drive gear 31 may be positioned concentrically within the chainring 12, 22 of the sprocket assembly 10, 20, i.e., see FIG. 2, so as to minimize interference with the sprocket assembly 10, 20 in the axial direction. This arrangement serves to maintain the axial position of the chainring 12, 22 for achieving a desirable chainline. However, under such arrangement the size of the drive gear 31 would be limited by the size of the chainring 12, 22. Typically, a smaller chainring would be preferred for providing a desirable torque output in application such as a mountain bike. In the present embodiment, the power-assisted drive assembly can accept a chainring with a number of teeth as low as 34, i.e., a 34T chainring.

Figure 13:
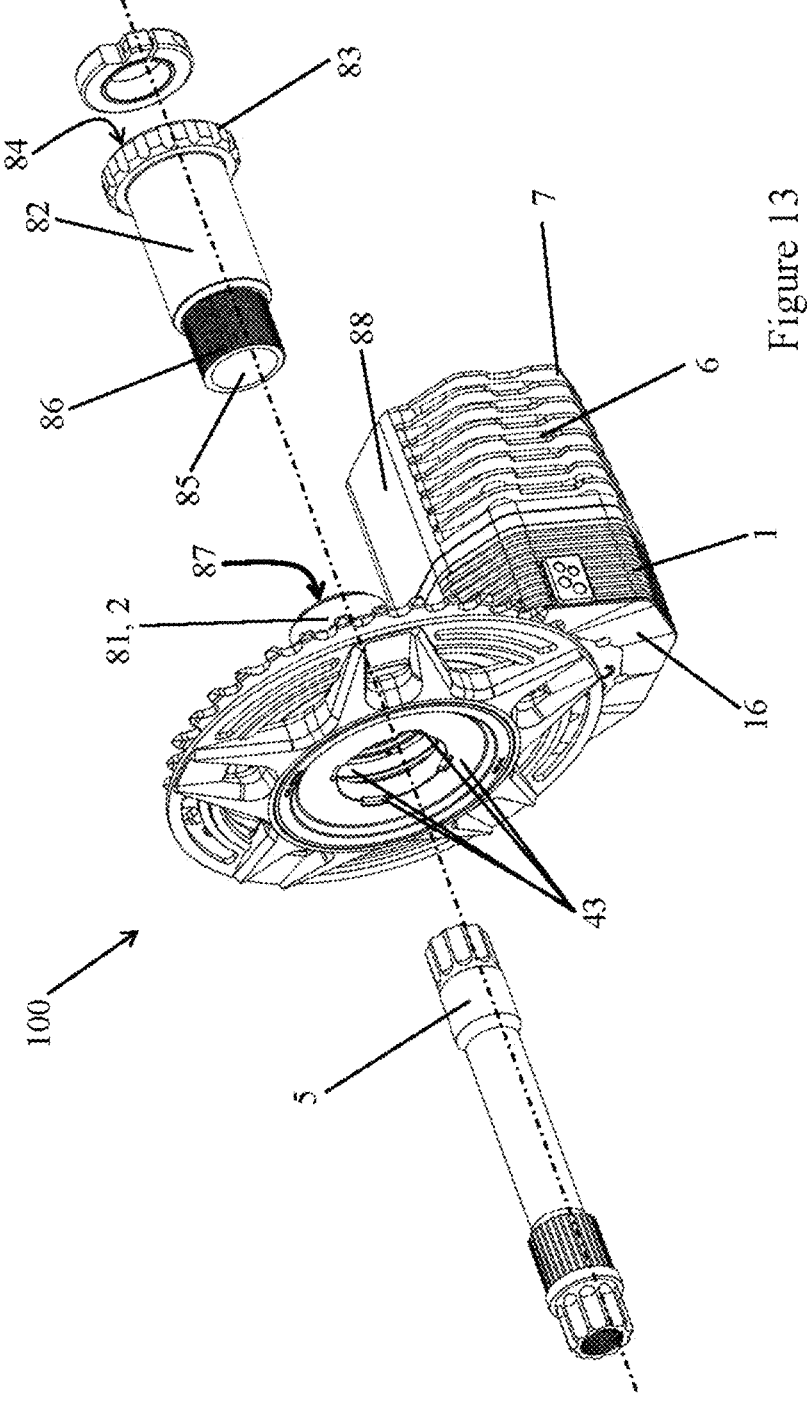
FIG. 13 is an exploded view showing the coupling of the mounting arrangement for the power-assisted drive assembly.

Preferably, the sprocket assembly 10, 20 may adopt a releasable coupling arrangement with the drive gear 31. In particular, the drive gear 31 includes an annular lip 35 for engagement with a centre opening 16, 26 of the sprocket body 11, 21 through a spline connection. For instance, inter-engageable splines 38*a* are provided on the circumferential side of an annular protruding edge 39 of the drive gear 31 for engagement with the complementary slots 38*b* provided on the centre opening 16, 26 of the sprocket body 11, 21. To maintain the engagement between the sprocket assembly 10, 20 and the drive gear 31, a locking member 40 is used to restrict axial movement of the sprocket body 11, 21 with respect to the drive gear 31. Specifically, as shown in FIG. 8, the locking member 40 may be a lock plate detachably coupled to the drive gear 31 for acting against the sprocket body 11, 21. For instance, the lock plate 40 is provided with a threaded portion 41 for engagement with the annular protruding edge 39 of the drive gear 31. The lock plate 40 includes a flanged-out portion 42 for abutting a peripheral portion of the centre opening 16, 26 of the sprocket body 11, 21. As the lock plate 40 is engaged and tightened against the drive gear 31, the lock plate 40 acts against the sprocket body 11, 21 in the axial direction thereby maintaining the sprocket assembly 10, 20 coupled to the drive gear 31. Advantageously, as shown in FIG. 13, a plurality of notches 43 may be provided on the lock plate 40 for engagement with a specific tool which facilitates the tightening or loosening of the lock plate 40.

In order to control the power output in correlation to the rider's pedaling effort, the power-assisted drive assembly 100 includes a torque sensing assembly 60. Referring to FIG. 9, the torque sensing assembly 60 situates between the drive spindle 5 and the drive gear 31 and forms part of the drivetrain. Essentially, the torque sensing assembly 60 includes a torque sensor (not shown) which is a measurement device which converts a torque measurement into an electrical signal that can be measured by an on-board computing device associated with the power-assisted drive assembly 100. The on-board computing device controls the output of motor to provide a predetermined amount of assisting power to the sprocket according to the torque measured at the drive spindle 5 generated by a rider during pedalling. For instance, the type of torque sensor used in the present invention is a reaction torque sensor, or a static torque sensor. As illustrated in FIG. 10, the torque sensing assembly includes two components, a first sensing part 61 for interfacing with the drive gear 31 through a second sprag clutch 65 (shown in FIG. 9), and a second sensing part 62 engageable with the drive spindle 5 through a splined connection therebetween. Due to the effect of the second sprag clutch 65, the first sensing part 61 couples and rotates with the drive gear 31 in only one direction, and the second sensing part 62 couples and rotates with the drive spindle 5. When the drive spindle 5 is subjected to a load, such as pedaling by the rider, the rotation resulted from the pedaling motion generates shear forces between the two sensing parts 61, 62. The shear force is captured by the strain gauges and transduced into electrical current readable by the on-board computing device. As a static type sensor, there would be only miniscule to no relative movement exhibit between the first sensing part 61 and the second sensing part 62. Desirably, the torque input from the drive spindle is transferred to the drive gear and the sprocket through the torque sensing assembly with minimal loss.

During the pedaling mode, the motor 50, if it is drivably connected to the sprocket assembly 10, 20, imposes rolling resistance in the drivetrain in its unpowered state resulting in loss of the rider's energy. Therefore, it would be desirable to have the motor 50 drivably disconnected with the sprocket assembly 10, 20 during pedaling by the rider. To minimize energy loss caused by the motor 50 during pedaling, a one-way sprag clutch 71 is provided within the gear mechanism 30. As shown in FIG. 11, the one-way sprag clutch 71 rotatably supports the first counter gear 34*a* in the gear mechanism 30. For instance, the first sprag clutch may be provided within the first counter gear 34*a* rotatably supporting the counter shaft 35. The second counter gear 34*b* may be integrally formed with the counter gear shaft and is adapted to engage the one-way sprag clutch 71. The first counter gear 34*a*, the one-way sprag clutch 71, the second counter gear 34*b* and the counter gear shaft 35 constitute a one-way counter gear assembly 34. The counter gear assembly 34 is rotatably supported by the main housing 1 by ball bearings 36. Based on the counter gear assembly 34, the first counter gear 34*a* only transfers power to the second counter gear 34*b* in a single direction, in this case, in anti-clockwise direction, and free-wheels in the other direction, i.e., in clockwise direction. As a result, the motor 50 is only effective in transferring rotational power to the sprocket assembly 10, 20 in clockwise direction thus is able to propel the pedal cycle in the forward direction. Contrariwise, as the rider applies a forward pedaling motion to the crank arms, the rotational power is transferred from the drive spindle 5 to the sprocket assembly 10, 20 hence causes the second counter gear 34*b* and counter gear shaft 35 to freewheel within the one-way sprag clutch 71. That is, when the rider pedals in forward direction, the sprocket assembly 10, 20 drivably disconnects with the motor 50 which is in the unpowered state.

During the power-assisted mode, the sprocket assembly 10, 20 drivably disconnects with the drive spindle 5 in only one direction such that the motor's power would be bypassed at the drive spindle 5, or the crank arms, so as to prevent or reduce the motor's torque transmitted to the crank arms which may interfere with the pedaling motion of the rider. According to FIG. 12, the drivetrain may further include another one-way sprag clutch 72 for selectively disconnecting the drive spindle 5 and the sprocket assembly 10, 20 while the motor 50 is in forward motion, i.e., with the output shaft 33 rotating in clockwise direction. Precisely, the one-way sprag clutch 72 is disposed between the drive gear 31 and first sensing part 61 of the torque sensing assembly 60. Accordingly, the one-way sprag clutch 72 allows the sprocket assembly 10, 20, rotating in forward or clockwise direction, to freewheel with respect to the drive spindle 5. Consequently, under the power-assisted mode the sprocket assembly 10, 20 can be driven by both the crank arms and the motor 50 without causing undesirable amount of feedback force at the crank arms due to the motor's torque.

Referring back to FIG. 1. FIG. 2, the main housing 1 includes a mounting arrangement 80 for securing the power-assisted drive assembly 100 to a frame of, for instance, a bicycle. As specifically depicted in FIG. 13, the mounting arrangement 80 is provided for detachably engaging with the bottom bracket shell of the bicycle frame (not shown). The mounting arrangement 80 generally includes a first mounting part 81 and a second mounting part 82. The first mounting part 81 extends from the spindle support portion 2. The second mounting part 82 is essentially a continuation or an extension of the first mounting part 81 and is detachably engageable with the first mounting part 81. One end of the second mounting part 82 is provided with an annular flange 83, and is formed with a circular recess 84 for accommodating a spindle bearing (not shown). The peripheral surface of the annual flange 83 of the second mounting part 82 may be toothed or serrated for facilitating rotation by a tool, for example, a wrench with a complementary socket. Each of the first mounting part 81 and the second mounting part 82 includes a hollow shank structure with a centre through-hole 85 for accommodating the drive spindle 5. Moreover, the first mounting part 81 is adapted to be insertable into the bottom bracket shell from a driving side, while the second mounting portion 82 is adapted to be insertable into the bottom bracket shell from a non-driving side. Preferably, the first mounting part 81 is integrally formed with the spindle support portion 2, as shown in FIG. 2, or it can be formed as a separate part attachable to the spindle support portion 2. A releasable engagement may be provided between the first mounting part 81 and the second mounting part 82. For instance, as shown in FIG. 13, a free end of the second mounting portion 82 may include an engagement end 86, i.e., a threaded shank, for engagement with a receiving end 87. i.e., a complementary threaded bore, provided on the first mounting part 81, or vice versa.

To allow for insertion, the outer diameters of the first and second mounting portions 81, 82 are slightly smaller than the inner diameter of the bottom bracket shell. Preferably, the fit between the first and second mounting part 81, 82 and the bottom bracket shell should be free of interference, i.e., a clearance fit. Upon engagement, the first and second mounting portions 81, 82 are required to be aligned axially within the bottom bracket shell. The first and second mounting portions 81, 82, once engaged, form a hollow shank within the bottom bracket shell, with the first mounting part 81 and the second mounting part 82 positioned concentric with the drive spindle 5 or the spindle axis. Further engagement of the second mounting part 82 with the first mounting part 81, i.e., tightening of the second mounting part 82, allows for a pressure to be exerted on the driving side and the non-driving sides of the bottom bracket shell thereby securing the main housing 1 to the bottom bracket shell. As the power-assisted drive assembly 100 is mounted to the bottom bracket shell, the first and second mounting parts 81, 82 together serve as a bottom bracket extending through the entire width of the bottom bracket shell for rotatably supporting the drive spindle 5. Preferably, the first mounting part 81 and the second mounting part 82 may provide engageable threads 86, 87 with a range of 15 mm to 30 mm in length for accommodating bottom bracket shells of different widths.

Preferably, the main housing 1 may be formed such that the motor mounting portion 2 lies directly under the bottom bracket shell of the bicycle with the power-assisted drive assembly 100 is mounted. Preferably, an uppermost surface 88 of the motor mounting portion 3 should be spaced apart from the spindle axis at a certain distance, for example, 25 mm-30 mm. Such an arrangement would provide sufficient clearance for fitting the power-assisted drive assembly 100 to bottom bracket shells having different wall thickness.

The main housing 1 further includes a motor housing 6 for housing the motor 50. Preferably, the motor housing 6 surrounds the circumferential side of the motor 50 and its inner surface lies in proximity to the motor 50. Advantageously, the motor housing 6, made out of heat conductive metallic material, such as aluminum alloy, functions as a heatsink for the motor 50. On the outer surface of the motor housing 50, a plurality of fins 7 may be provided. In particular, the plurality of fins 7 runs in a direction parallel with a traveling direction of the bicycle. The fins 7 serve to direct airflow to contact with the motor housing 6 along the traveling direction, thereby carrying the heat away from the power-assisted drive assembly 100.

The main housing 1 includes a gear cavity 15 spatially connecting the spindle supporting portion 2 and the motor mounting portion 3, as shown in FIG. 3 and FIG. 4. The gear cavity 15 houses and preferably conceals the gear mechanism 30. Preferably, the main housing 1 further includes a wiring cavity 17 in the motor mounting portion 3. The wiring cavity 17 serves to provide a space for accommodating the lead wires connecting to the motor 50, or other electronic components, such as controllers, for operating the motor 50. Specifically, the wiring cavity 17 is spatially isolated from the drivetrain cavity 15 and is preferably sealed against water or dust ingression. A detachable cover 16 may be provided for sealing the wiring cavity 17 and providing access to the same once detached.

Figure 14:
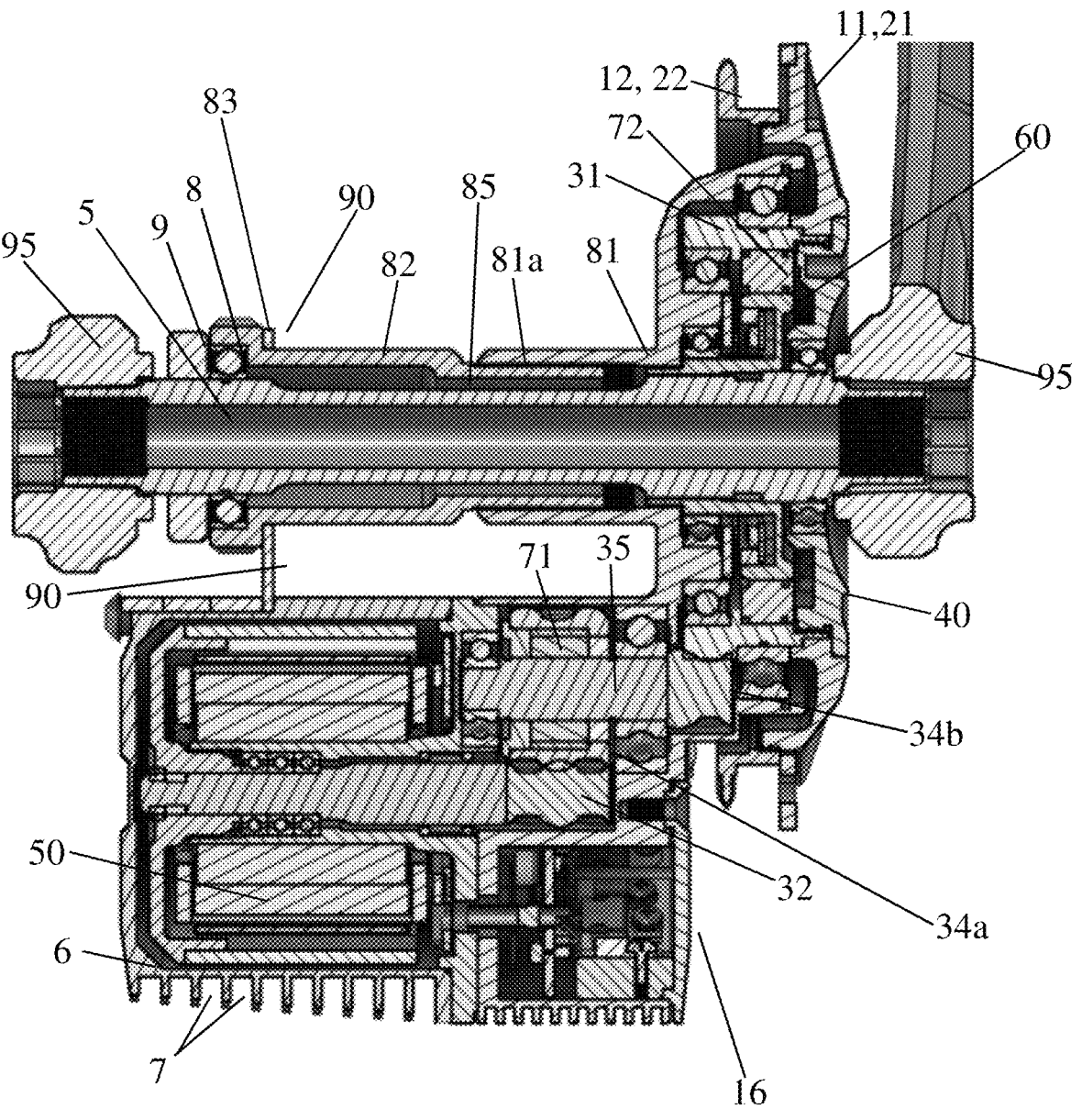
FIG. 14 is a section view showing internal structure of the power-assisted drive assembly.
Figure 15:
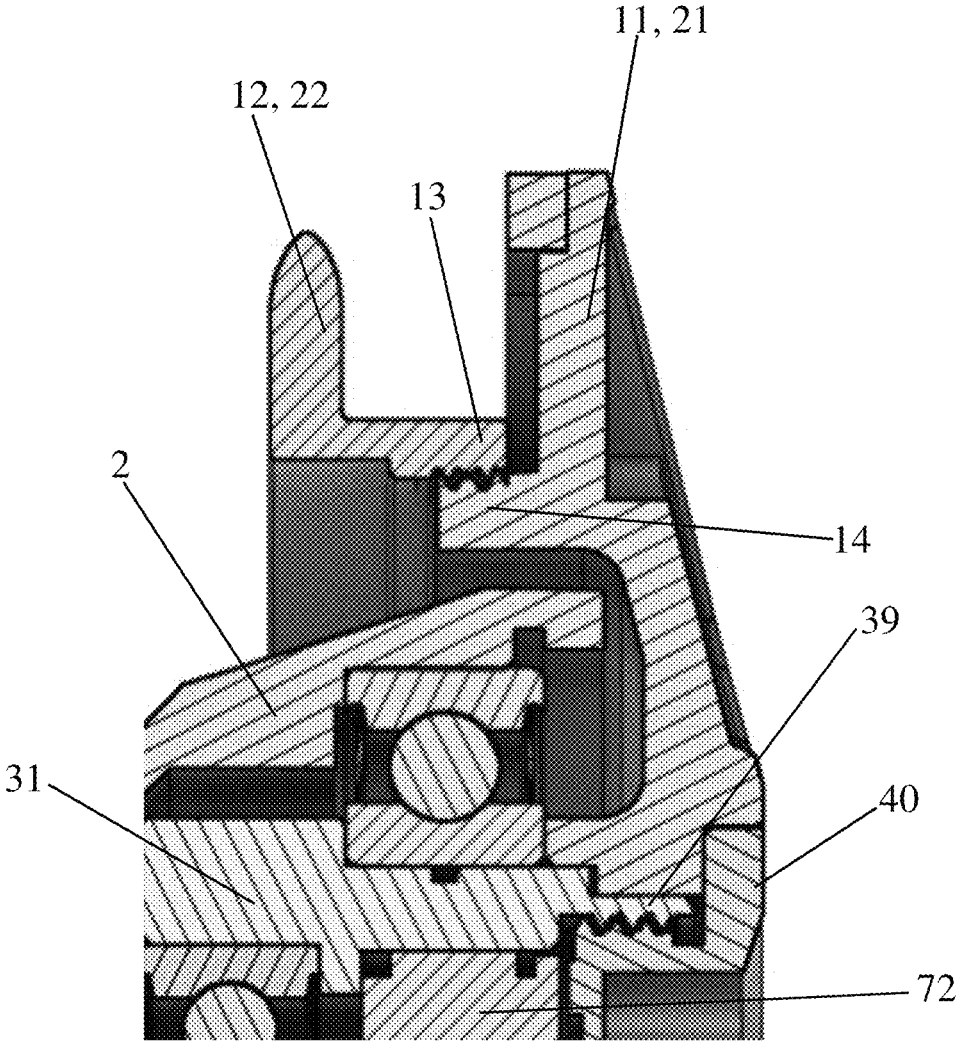
FIG. 15 is an enlargement of a highlighted area in the section view of FIG. 14.

FIG. 14 and FIG. 15 are section views generally illustrating the positional relationships between the various mentioned components of the power-assisted drive assembly 100. In particular, as shown, crank arms are each attached to an end of the drive spindle 5 through a spline connection.

According to an embodiment, the power-assisted drive assembly 100 may optionally include an additional mounting arrangement 90 for securing the assembly 100 to the bottom bracket shell on the non-driving side. The additional mounting arrangement 90 may be positioned on the motor mounting portion 3 of the main housing 1. For instance, as shown in FIG. 14, the additional mounting arrangement may be an extension from the motor mounting portion 3 may be an L-shape bracket 90 adapted for attaching to the non-driving side of the bottom bracket shell. Upon tightening of the mounting portions 81, 82, the annular flange 83 acts against the non-driving side of the bottom bracket shell and the L-shape bracket 90 therebetween, as shown.

The power-assisted drive assembly as described in the above may be retrofitted to a pedal cycle, such as a multi speed mountain bike with a standardized bottom bracket shell, either a threaded or press fit shell. Before retrofitting the power-assisted drive assembly, all the moving parts, including but not limited to crank arms, sprocket, drive spindle, spindle bearings, and bottom brackets would be removed from the bottom bracket shell of the frame.

To install the power-assisted drive assembly 100 to a bicycle frame, the first step involves inserting the first mounting part 81 into the bottom bracket shell from a driving side of the bicycle frame. While maintaining the first mounting part 81 in the bottom bracket shell, the second mounting part 82 can be inserted into the bottom bracket shell from a non-driving side. Next, the threaded shank of the second mounting part 82 is inserted into the threaded bore 81*a* of the first mounting part 81 by rotating the second mounting part 82 relative to the first mounting part 81 in a tightening direction. Upon the second mounting part 82 is fully tightened, the drive assembly 100 is aligned to a position directly under the bottom bracket shell. The second mounting part 82 is further tightened until the drive assembly 100 is secured in position. The mounting method as described in the foregoing allows for the replacement of spindles with different lengths, along with a second mounting part of a required length, as needed. This provides the added versatility for the drive assembly 100 to fit different types of bicycle frame having bottom bracket shell of different widths.

Following the mounting of the drive assembly to the bicycle frame, the drive spindle 5 is inserted through the first and second mounting parts 81, 82 from the driving side, with the splines on the drive spindle 5 in engagement with the torque sensing assembly 60, thereby drivably connecting the drive spindle 5 with the drive gear 31. Specifically, the drive spindle 5 connects to the second sensing part 62 of the torque sensing assembly 60 through the spline connection provided therebetween, thereby drivably connects the drive spindle 5 to the drive gear 31 through the one-way sprag clutch 72. A spindle bearing 8 is then inserted into the bearing seat at the second mounting part 82 for rotatably supporting the drive spindle 5 at the non-driving side. To secure the drive spindle 5 in place, a stopper 9 is mounted on the non-driving side of the drive spindle 5 immediate to the spindle bearing 9. Lastly, a crank arm 95 is attached to each end of the drive spindle 5. Optionally, the power-assisted drive assembly 100 may be further secured to the bicycle frame by securing the motor mounting portion 3 of the main housing 1 to the downtube of the bicycle frame through the additional mounting arrangement (not shown).

As those skilled in the art would appreciate, a mid-drive motor system would be considered a more superior and desirable arrangement than a hub motor arrangement when converting a conventional self-pedaling bicycle to a power-assisted bicycle. Particularly, when retrofitting a drive system to mountain bikes, a mid-drive motor system can provide unparallel gearing versatility and efficiency. If using a motor of a considerable size in the mid-drive system, it can lead to insufficient bottom ground clearance and would greatly hinder rideability particularly, in offroad situations. Therefore, it is desirable to have a mid-drive system, such as what has been discussed in the foregoing sections, which utilizes an outrunner type motor with a relatively smaller diameter, yet providing sufficient torque output for powering a mountain bike. With the motor having a much smaller diameter, the overall size of the mid-drive system is reduced while the ground clearance can be enhanced. Moreover, an overall smaller mid-drive system can provide more clearance between the bottom bracket shell and the motor housing, which adds the flexibility for the mid-drive system to be compatible with bottom bracket shells of different sizes and frames of different geometries. The mid-drive system as discussed further provides the robustness to support spindles with larger diameters which may be required for satisfying reliability need for heavy-duty applications, i.e., offroad riding.

The foregoing only illustrates and describes examples whereby the present invention may be carried out, and that modifications and/or alterations may be made thereto without departing from the spirit of the invention.

It should be understood that although the specification is described in terms of embodiments, not every embodiment includes only a single technical solution. This description of the specification is merely for the sake of clarity. Those skilled in the art should regard the specification as a whole, and the technical solutions in the embodiments can also be combined appropriately to form other embodiments that can be understood by those skilled in the art.

All references specifically cited herein are hereby incorporated by reference in their entireties. However, the citation or incorporation of such a reference is not necessarily an admission as to its appropriateness, citability, and/or availability as prior art to/against the present invention.

It is appreciated that the protection scope of the present invention is defined by the appended claims rather than the foregoing description, and it is therefore intended that all changes that fall within the meaning and scope of equivalency of the claims are included in the present invention and any reference signs in the claims should not be regarded as limiting the involved claims.

The invention claimed is:

1. A power-assisted drive assembly for retrofitting on a pedal cycle comprising:
a sprocket assembly;
a drive spindle drivably connected to the sprocket assembly through a first one-way sprag clutch;
a main housing rotatably supporting the drive spindle and defining a spindle axis, the main housing comprising a spindle supporting portion and a motor mounting portion;
a motor mounted on the motor mounting portion and drivably connected to the sprocket assembly, the motor having a drive axis offset to the spindle axis;
a gear mechanism drivably connecting the motor and the sprocket assembly, comprising a second one-way sprag clutch and a drive gear mounted concentrically with the sprocket assembly, the drive gear adapted for removably coupling with the sprocket assembly; and
a mounting arrangement configured for mounting the drive assembly to a bottom bracket shell of the pedal cycle, comprising a first mounting part integral with the spindle supporting portion and a second mounting part, the first mounting part and the second mounting part both being insertable into the bottom bracket shell and configured to be threadedly engageable with each other, wherein the first mounting part and the second mounting part form a hollow shank within the bottom bracket shell which the drive spindle extends therethrough; and wherein the motor comprises a stator surrounded by a rotor, a pinion gear is provided on the rotor drivably connects with the gear mechanism for driving the drive gear and the sprocket assembly, the gear mechanism further includes a reduction gear set arranged between the rotor of the motor and the drive gear.

2. The power-assisted drive assembly according to claim 1, wherein the sprocket assembly comprises a detachable chainring adapted for engaging a chain.

3. The power-assisted drive assembly according to claim 1, wherein the reduction gear set comprises a double stage reduction gear providing a reduction ratio of at least 1:15.

4. The power-assisted drive assembly according to claim 1, wherein the second one-way sprag clutch is provided within the gear mechanism between the motor and the drive gear, the second one-way sprag clutch allows the sprocket assembly to freewheel with respect to the rotor of the motor with the sprocket assembly rotating in only one direction, and the second sprag clutch is fitted within a counter gear assembly in the gear mechanism.

5. The power-assisted drive assembly according to claim 4, wherein the second one-way sprag clutch is fitted within a counter gear assembly connecting a pinion gear of the motor to the drive gear, and the second one-way sprag clutch is sleeved between a first counter gear and a counter gear shaft within the counter gear assembly.

6. The power-assisted drive assembly according to claim 1, further comprising a torque sensing assembly provided between the drive spindle and the drive gear, wherein the first one-way sprag clutch is disposed between the torque sensing assembly and the drive gear, the first one-way sprag clutch allows the drive spindle to freewheel with respect to the sprocket assembly in only one direction.

7. The power-assisted drive assembly according to claim 1, wherein the rotor of the motor is cylindrical shaped, the rotor comprises an inner circumferential wall, with a plurality of permanent magnets circumferentially arranged on the inner circumferential wall.

8. The power-assisted drive assembly according to claim 7, wherein the motor is a brushless DC outrunner motor.

9. The power-assisted drive assembly according to claim 1, wherein the first mounting part is insertable into the bottom bracket shell from a driving side, and the second mounting part is insertable into the bottom bracket from a non-driving side, the engagement between the first and the second mounting parts is adapted for exerting a pressure on the two sides of the bottom bracket shell.

10. The power-assisted drive assembly according to claim 1, wherein the sprocket assembly is detachably coupled to the drive gear by a spline connection, and the sprocket assembly comprises a locking member adapted for maintaining the spline connection between the sprocket assembly and the drive gear.

11. The power-assisted drive assembly according to claim 10, wherein the locking member is a lock plate adapted for detachably coupling to the drive gear to act against the sprocket assembly along a spindle axis defined by the spindle.

12. A power-assisted drive assembly for retrofitting on a pedal cycle comprising:
a sprocket assembly;
a drive spindle drivably connected to the sprocket assembly through a one-way sprag clutch;
a main housing rotatably supporting the drive spindle and defining a spindle axis, the main housing comprising a spindle supporting portion and a motor mounting portion;

a motor mounted on the motor mounting portion and drivably connected to the drive spindle, the motor having a drive axis offset to the spindle axis;

a gear mechanism drivably connected to the motor and the sprocket assembly, the gear mechanism comprising a second one-way spray clutch;

wherein the main housing comprises a mounting arrangement for engagement with a bottom bracket shell of the pedal cycle, the mounting arrangement comprises a first mounting part connected to the spindle support portion and insertable into the bottom bracket shell from a driving side of the pedal cycle, and a second mounting part insertable into the bottom bracket shell from a non-driving side of the pedal cycle and configured for engaging with the first mounting part within the bottom bracket shell, wherein the first mounting part and the second mounting part are configured to be threadedly engageable such that the mounting arrangement can accommodate bottom bracket shells of different widths.

13. The power-assisted drive assembly according to claim 12, wherein each of the first mounting part and the second mounting part lies concentric with the spindle axis, and comprises a hollow shank adapted for accommodating the drive spindle.

14. The power-assisted drive assembly according to claim 13, wherein one end of the second mounting part is provided an annular flange for abutment with the non-driving side of the bottom bracket shell, and is formed with a circular recess for accommodating a spindle bearing, and splines are provided on the circumferential surface of the annual flange for facilitating rotating of the second mounting part by a tool.

15. The power-assisted drive assembly according to claim 14, wherein the spindle axis is offset from a nearest surface of the motor housing by at least 25 mm.

16. The power-assisted drive assembly according to claim 12, wherein the main housing comprises a drivetrain cavity spatially connecting the spindle supporting portion and the motor mounting portion.

17. The power-assisted drive assembly according to claim 16, wherein the main housing comprises a wiring cavity in the motor mounting portion, the wiring cavity is spatially isolated from the drivetrain cavity.

18. The power-assisted drive assembly according to claim 17, wherein the motor housing is arranged so that an inner surface of the motor housing lies in proximity to a surface of the motor.

19. The power-assisted drive assembly according to claim 12, comprising an additional mounting arrangement for securing the drive assembly to a downtube of the pedal cycle.

20. A power-assisted drive assembly for retrofitting on a pedal cycle comprising:

a sprocket assembly;

a drive spindle drivably connected to the sprocket assembly through a first one-way sprag clutch;

a main housing rotatably supporting the drive spindle and defining a spindle axis, the main housing comprising a spindle supporting portion and a motor mounting portion;

a motor mounted on the motor mounting portion and drivably connected to the sprocket assembly, the motor having a drive axis offset to the spindle axis;

a gear mechanism drivably connecting the motor and the sprocket assembly, comprising a second one-way sprag clutch and a drive gear mounted concentrically with the sprocket assembly, the drive gear adapted for removably coupling with the sprocket assembly; and a mounting arrangement configured for mounting the drive assembly to a bottom bracket shell of the pedal cycle, comprising a first mounting part connected with the spindle supporting portion and a second mounting part, the first mounting part and the second mounting part both being insertable into the bottom bracket shell and configured to be threadedly engageable with each other, wherein the first mounting part and the second mounting part, once engaged, form a hollow shank extending through the bottom bracket shell, through which the drive spindle is rotatably supported by the hollow shank.

* * * * *